US010930254B2

(12) United States Patent
Melhart

(10) Patent No.: US 10,930,254 B2
(45) Date of Patent: Feb. 23, 2021

(54) FOLDING MARIMBA

(71) Applicant: JIM MELHART PIANO AND ORGAN COMPANY, McAllen, TX (US)

(72) Inventor: Jimmie Ray Melhart, McAllen, TX (US)

(73) Assignee: Jim Melhart Piano and Organ Company, McAllen, TX (US)

(*) Notice: Subject to any disclaimer, the term of this patent is extended or adjusted under 35 U.S.C. 154(b) by 0 days.

(21) Appl. No.: 16/866,393

(22) Filed: May 4, 2020

(65) Prior Publication Data

US 2020/0335071 A1 Oct. 22, 2020

Related U.S. Application Data

(63) Continuation of application No. 16/443,335, filed on Jun. 17, 2019, now Pat. No. 10,643,590, which is a continuation of application No. 15/921,584, filed on Mar. 14, 2018, now Pat. No. 10,325,577.

(51) Int. Cl.
*G01D 13/08* (2006.01)
*G10D 13/08* (2020.01)

(52) U.S. Cl.
CPC .................................... *G10D 13/08* (2013.01)

(58) Field of Classification Search
CPC ...................................................... G01D 13/08
See application file for complete search history.

(56) References Cited

U.S. PATENT DOCUMENTS 3,776,091 A * 12/1973 Suzuki .................. G10D 13/08 84/403
4,646,614 A 3/1987 Suzuki
4,848,207 A 7/1989 Kawai
5,463,925 A 11/1995 Galocy
5,479,843 A 1/1996 Yanagisawa
6,696,628 B2 2/2004 Toshida
D609,499 S 2/2010 Irisa
9,029,674 B2 * 5/2015 Gold ........................ G10O 3/12 84/423 R
9,406,287 B2 8/2016 Glowka
10,325,577 B1 * 6/2019 Melhart ................. G10D 13/08
2016/0148601 A1 5/2016 Glowka
2019/0304416 A1 * 10/2019 Melhart ................. G10D 13/08

* cited by examiner

*Primary Examiner* — Robert W Horn
(74) *Attorney, Agent, or Firm* — Pizarro Allen PC

(57) ABSTRACT

A foldable idiophone musical instrument may have two frames to support accidental tone bars on the first frame and natural tone bars on the second frame. Connecting members may attach to opposite ends of the frames. The connecting members may allow the frames to rotate from 0° to 180° from a horizontal position to collapse or fold the instrument. The connecting members may have a riser portion and a stop block portion. The riser portion may elevate the accidental tone bars above the natural tone bars. The stop block portion may prevent the frames from rotating to less than 0° from the horizontal when in a performance position.

1 Claim, 7 Drawing Sheets

FOLDING MARIMBA

CROSS REFERENCE TO RELATED APPLICATIONS

This application is a continuation of U.S. patent application Ser. No. 16/443,335 filed Jun. 17, 2019, which is a continuation of U.S. patent application Ser. No. 15/921,584 filed Mar. 14, 2018, now U.S. Pat. No. 10,325,577, the disclosure of each of which is incorporated herein by reference.

COPYRIGHT NOTICE

This application contains material that is subject to copyright protection. Such material may be reproduced exactly as it appears in Patent and Trademark Office patent files or records. The copyright owner otherwise reserves all rights to such material.

BACKGROUND

This disclosure relates to the field of percussion musical instruments in general, and marimbas in particular.

A marimba is a percussion instrument including one or more sets of wooden bars disposed in a generally opposed, parallel relationship. The wooden bars (tone bars) are struck with mallets to produce musical tones. Normally, resonators suspended beneath the bars amplify their sound. The bars are arranged like keys on a piano, with groups of 2 or 3 accidentals raised vertically, overlapping the natural bars to aid the performer both visually and physically. The marimba is a type of idiophone, as is the xylophone. While the present disclosure uses the example of a marimba, it generally relates to percussion musical instruments such as xylophones, metallophones, vibraphones, and glockenspiels.

Because these instruments may have considerable length and width, there is a need to be able to make the size more compact for the player to carry the instrument. This is particularly a need when the player is a younger, smaller student. Further, in order to advance in skill development, the player should be able to practice on a full-size instrument rather than a smaller instrument adapted for the smaller student.

SUMMARY

An idiophone percussion musical instrument (for example, a marimba) according to some embodiments of this invention may incorporate first and second frames supporting tone bars with the frames joined by a unique connecting member which allows the frames to be folded into a compact formation, but when unfolded into a performance position, the frames are maintained in a spaced-apart, generally parallel relation wherein the frames are prohibited from over-rotating to a less than 0° angle from the horizontal position.

The present disclosure provides a solution to the "compacting" problems by enabling the tone bars to pivot away from each other and fold into a compact configuration.

Further, the present instrument may have a unique "stop block" which maintains the accidental tone bars in a parallel, spaced apart relationship with the natural tone bars when the instrument is folded back to a first performance position after being in a compacted, transportation position. The bars may not be over-rotated such that the frames are less than 0° from the horizontal position.

DETAILED DESCRIPTION

As used herein, the following terms should be understood to have the indicated meanings:

When an item is introduced by "a" or "an," it should be understood to mean one or more of that item.

"Comprises" means includes but is not limited to.

"Comprising" means including but not limited to.

"Having" means including but not limited to.

An idiophone musical instrument according to some embodiments of this invention will now be described by reference to the appended drawings.

Figure 1:
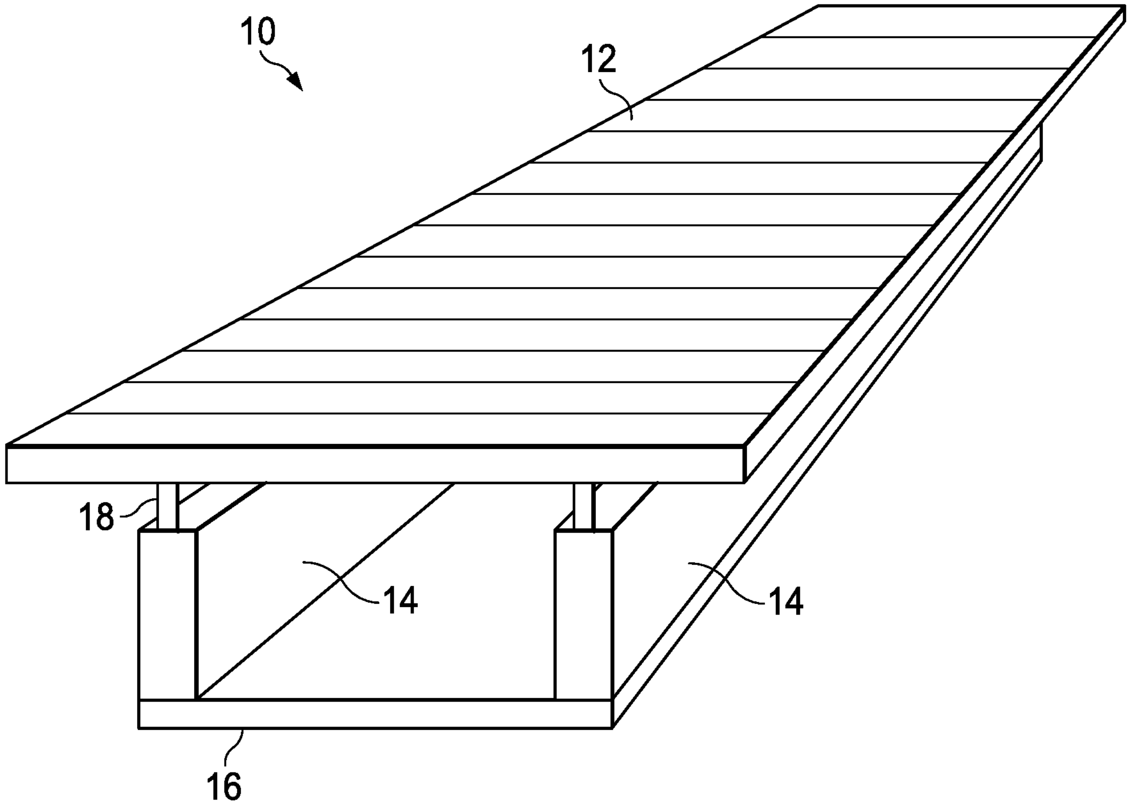
FIG. 1 is a perspective view of a generally u-shaped, rectangular frame for supporting one group of laterally extending tone bars.

FIG. 1 is a perspective view of one of the generally u-shaped, rectangular frames for supporting one group of laterally extending tone bars. It should be understood that the frame 10 in FIG. 1 could be supporting either the accidental tone bars or the natural tone bars 12. The u-shaped frame 10 has two, longitudinally opposed, parallel side walls 14 (or stringers) with a flat base member 16 attached to the bottom side of each of the stringers 14. Extending along the top side of the stringers are spaced apart screw eyes 18 which hold strings that allow the tone bars 12 to vibrate as is well known in the art. No resonating tubes are shown in the figures, but such would be understood by one skilled in the art.

Figure 3A:
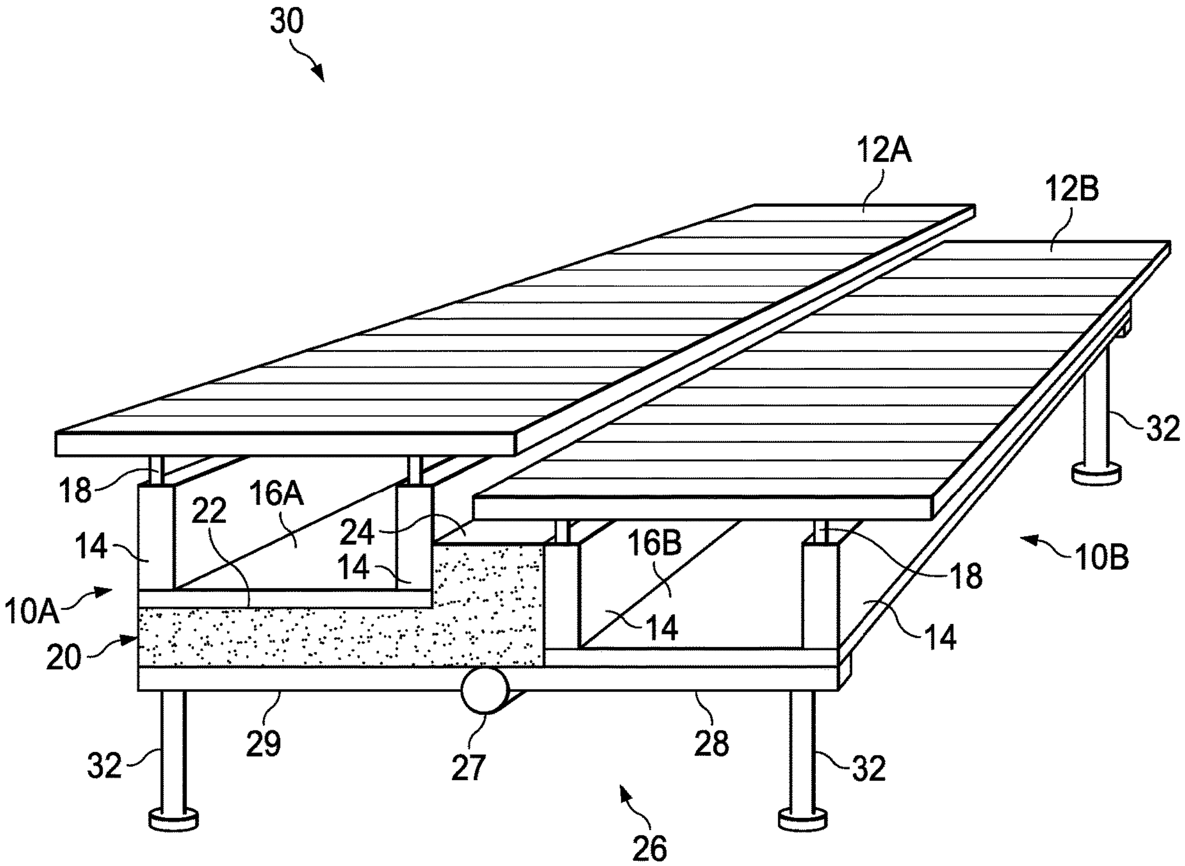
FIG. 3A is a side perspective view of an idiophone musical instrument in a first performing position with an end block separating a first frame from a second frame with the lateral tone bars on the first frame partially overlapping the tone bars on the second frame. Support legs are shown affixed at four corners of the instrument.

FIG. 3A shows a side perspective view of an idiophone musical instrument (here a marimba) in a first performance or playing position with a first frame 10A spaced apart from a second frame 10B with the first lateral tone bars 12A partially overhanging or overlapping the tone bars 12B supported on the second frame 10B. Maintaining the proper spaced-apart relationship of the frames and bars is an end block 20 on a connecting member 26.

Figure 2A:
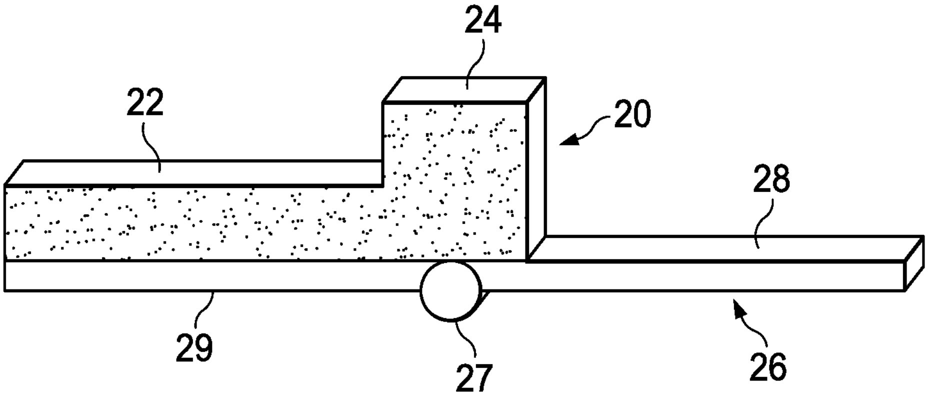
FIG. 2A is a side perspective view of an end block on a flat hinge showing the riser and stop block portions.

FIG. 2A illustrates in a side perspective view one of the L-shaped blocks 20 showing a riser portion 22 and a stop block portion 24. The block 20 is attached to hinge 27 of connecting member 26 along one leaf 29 while the other leaf

Figure 2B:
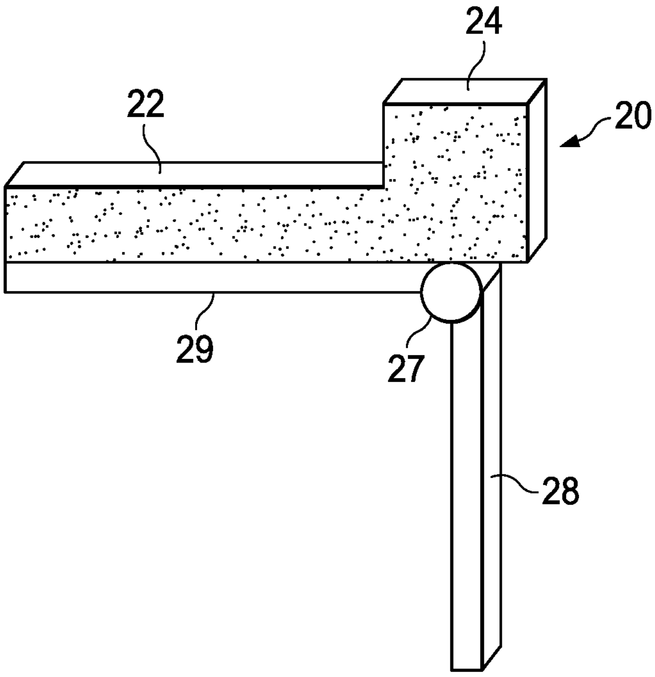
FIG. 2B is a side perspective view of the end block of FIG. 2A with the hinge rotated 90°.

28 will be attached to the second frame 10B as will be seen below. FIG. 2B illustrates leaf 28 of connecting member 26 of FIG. 2A rotated 90°.

Turning now to FIG. 3A, a marimba 30 is shown in a first performance position supported at four corners by removable legs 32. The accidental tone bars 12A are shown in a fixed, spaced-apart relationship from the natural tone bars 12B by stop block portion 24 of the end block 20 of connecting member 26. It should be noted that without stop block portion 24, the two frame sections 10A and 10B would continue to fold beyond 0° and cause interference of the tone bars 12A and 12B. This is particularly the case if the legs 32 were uneven on a support surface (not shown).

FIG. 3A shows that a first frame 10A with tone bars 12A may be mounted on the riser portion 22 of end block 20 with the base member 16A attached to the riser portion 22. One connecting member 26 is attached to end block 20 at leaf 29 at each end of each of the side walls 14 thereby supporting and retaining one of the frames (10A). It may be seen in FIG. 3A that a second frame 10B with the natural tone bars 12B may be attached at leaf 28 to the base member 16B of the frame 10B.

Figure 3B:
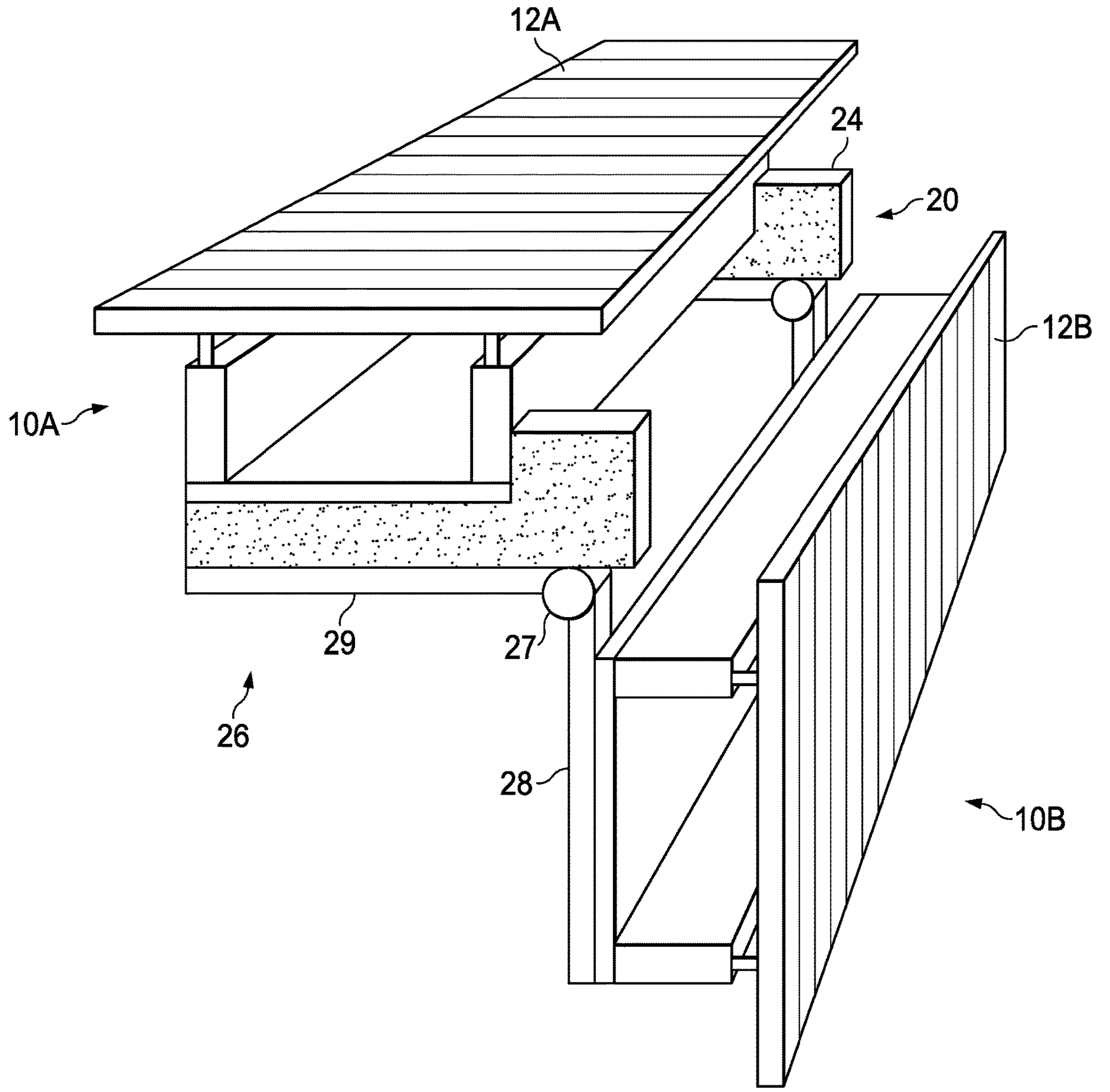
FIG. 3B is a perspective view of the instrument of FIG. 3A illustrating a 90° rotation of one of the frames from the other. The end blocks are shown affixed to opposite ends of the stringers with one of the frames mounted on top of the end blocks.

FIG. 3B illustrates the rotation of frame 10B 90° from 0° as the instrument 30 is being folded or compacted for transport or storage.

Figure 3C:
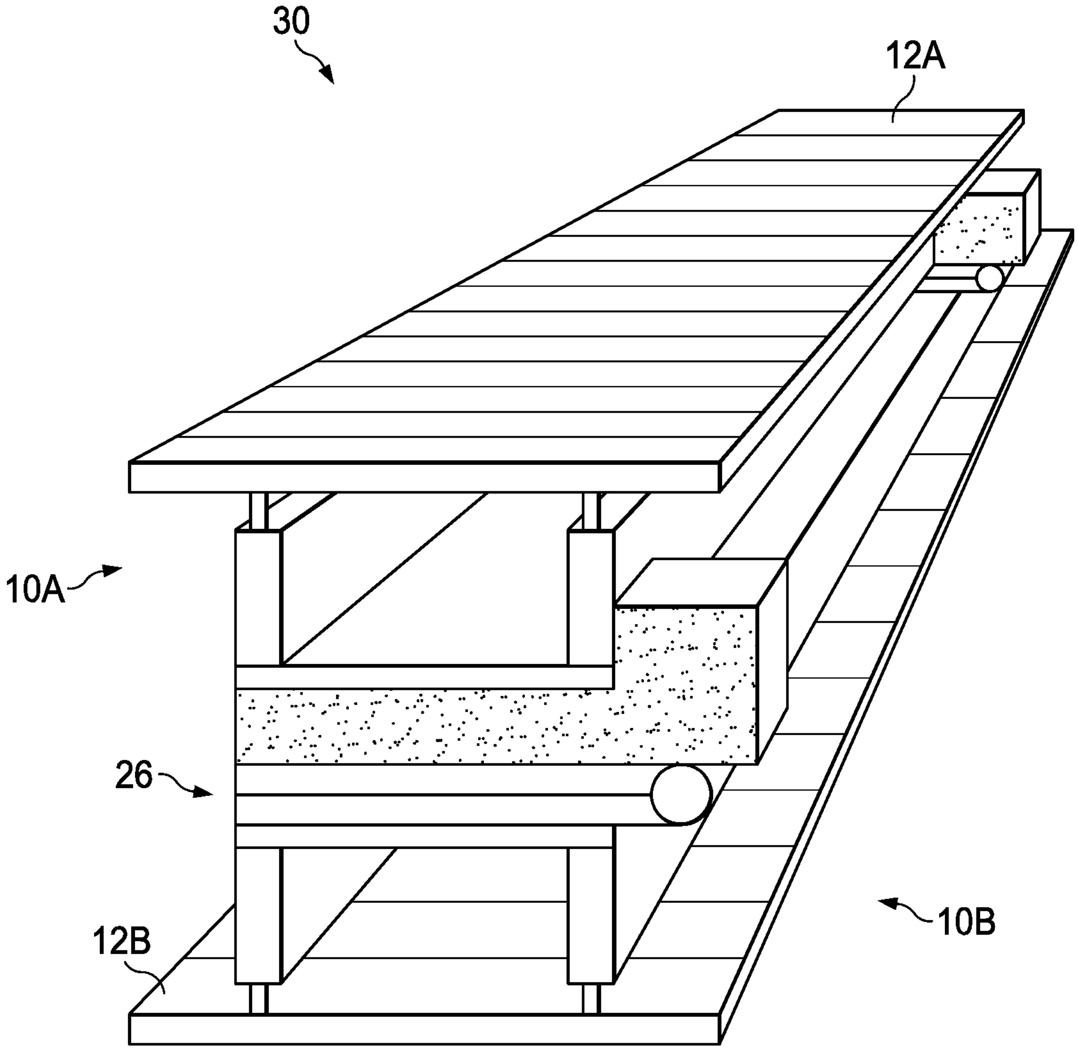
FIG. 3C is a perspective view of the instrument of FIG. 3A showing a complete folding or compacting of the instrument as the frames are rotated 180°.

FIG. 3C illustrates the complete folding of the instrument 30 into a folded position in which tone bars 12A and 12B face substantially away from each other. It will be understood by those skilled in the art that while the tone bars 12A and 12B are on the outer face in the folded position, most instruments are stood and transported in protective cases and, therefore, damage is not likely to occur to the tone bars.

Figure 4A:
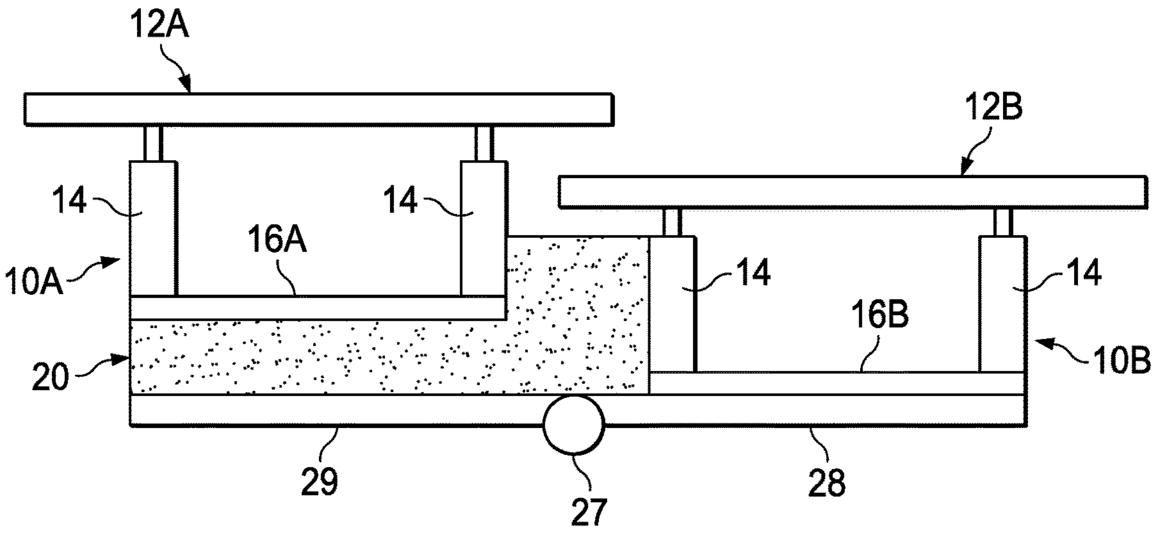
FIG. 4A is a side elevation view of the instrument shown in FIG. 3A.
Figure 4B:
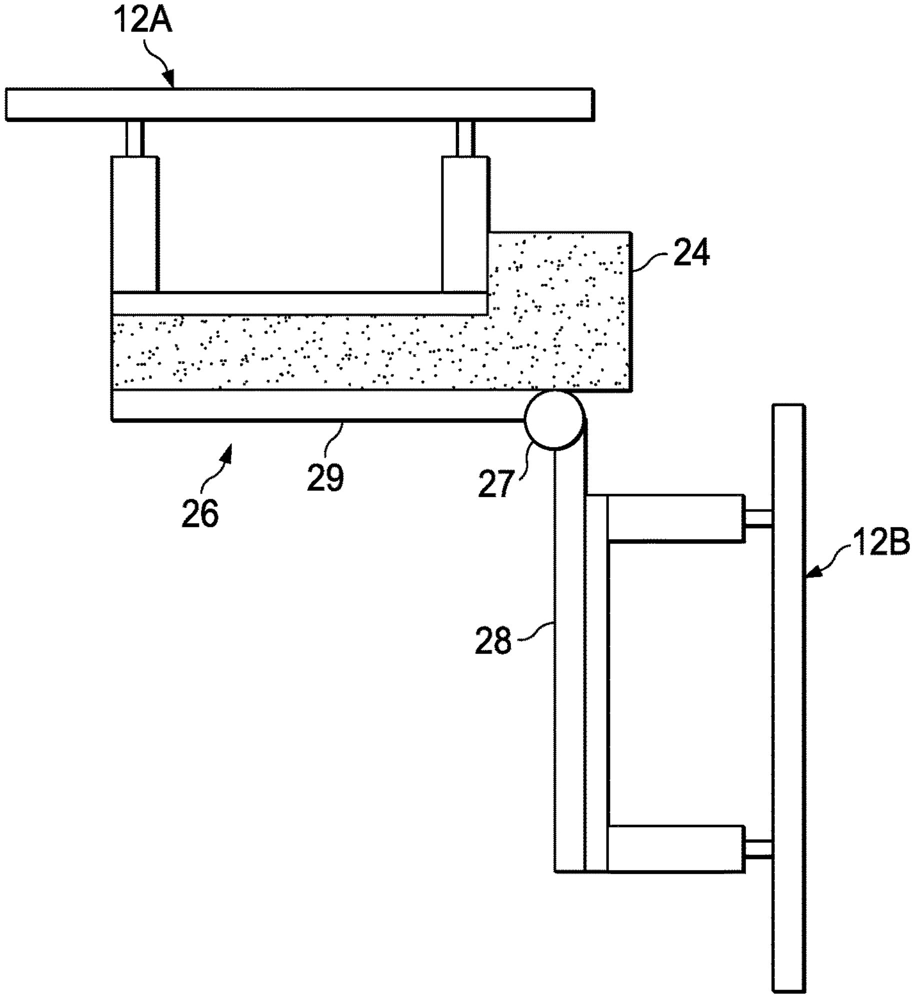
FIG. 4B is a side elevation view of the instrument shown in FIG. 3B.
Figure 4C:
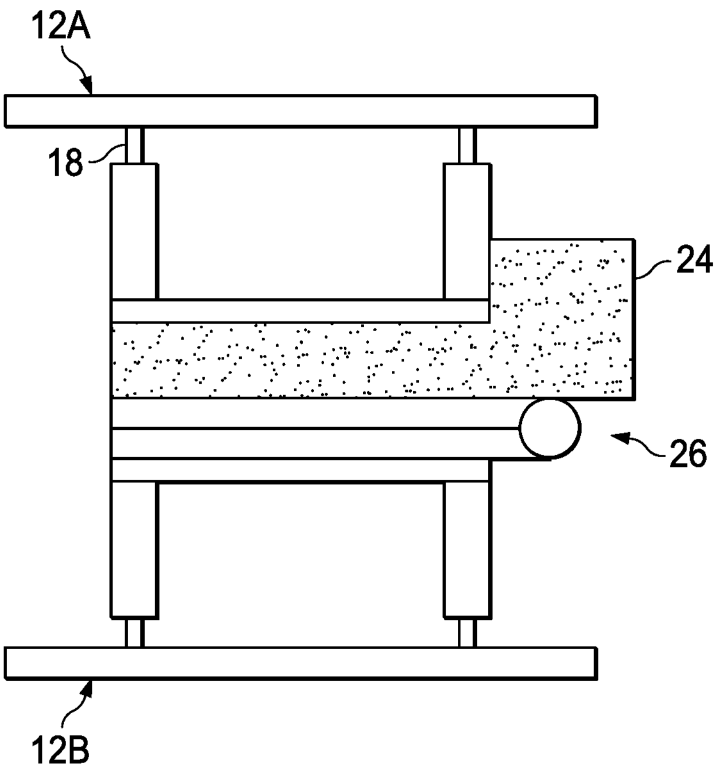
FIG. 4C is a side elevation view of the instrument shown in FIG. 3C.

FIGS. 4A through 4C are side elevation views of the instrument 30 shown in FIGS. 3A through 3C, respectively. One skilled in the art is able to understand the elements disclosed in FIGS. 4A through 4C in light of the above description of FIGS. 1 through 3C.

The embodiments described herein are some examples of the current invention. Various modifications and changes of the current invention will be apparent to persons of ordinary skill in the art. Among other things, any feature described for one embodiment may be used in any other embodiment. Terms such as "first" and "second" are used to distinguish certain items and should not be construed to require a certain order or level of importance unless specifically so stated. Similarly, terms such as "upper" and "lower" are used to distinguish certain items and should not be construed to require a certain orientation unless specifically so stated. The scope of the invention is defined by the attached claims and other claims to be drawn to this invention, considering the doctrine of equivalents, and is not limited to the specific examples described herein.

What is claimed is:

1. A musical instrument comprising:

a first frame;

a first group of tone bars supported by said first frame;

a second frame;

a second group of tone bars supported by said second frame; and wherein said first and second frames are rotatably configurable about one or more hinges in a performance position in which said first and second groups of tone bars face in a first direction, and a folded position in which said first and second groups of tone bars face substantially away from each other.

* * * * *